United States Patent
Kiwaki

(10) Patent No.: US 9,302,551 B2
(45) Date of Patent: Apr. 5, 2016

(54) PNEUMATIC TIRE WITH TREAD HAVING V-SHAPED GROOVE

(75) Inventor: Yukihiro Kiwaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 999 days.

(21) Appl. No.: 12/531,197

(22) PCT Filed: Mar. 10, 2008

(86) PCT No.: PCT/JP2008/054320
§ 371 (c)(1),
(2), (4) Date: Sep. 14, 2009

(87) PCT Pub. No.: WO2008/126551
PCT Pub. Date: Oct. 23, 2008

(65) Prior Publication Data
US 2010/0096054 A1    Apr. 22, 2010

(30) Foreign Application Priority Data

Mar. 14, 2007 (JP) .................................. 2007-064634

(51) Int. Cl.
*B60C 11/03* (2006.01)
*B60C 11/13* (2006.01)

(52) U.S. Cl.
CPC ............. *B60C 11/13* (2013.01); *B60C 11/0304* (2013.04); *B60C 11/1384* (2013.04); *B60C 11/1392* (2013.04)

(58) Field of Classification Search
CPC ............ B60C 11/0304; B60C 11/1384; B60C 11/1392; B60C 11/13
USPC ............ 152/209.8, 209.15, 209.21; D12/518, D12/519
See application file for complete search history.

(56) References Cited

U.S. PATENT DOCUMENTS

| 5,435,364 A | * | 7/1995 | Hasegawa ............ B60C 11/0302 152/209.18 |
| 6,478,062 B1 | * | 11/2002 | Schomburg ............... 152/209.18 |

(Continued)

FOREIGN PATENT DOCUMENTS

| EP | 1506884 A1 | * | 2/2005 |
| JP | 06-344726 A | * | 12/1994 |

(Continued)

OTHER PUBLICATIONS

Machine translation for Japan 09-002024 (no date).*

(Continued)

*Primary Examiner* — Steven D Maki
(74) *Attorney, Agent, or Firm* — Sughrue Mion, PLLC

(57) ABSTRACT

At least one of land portion sections 14, 15, 16 that are formed in a tread surface portion 10a is constituted by a first land portion 17 and a second land portion 18 being alternately and consecutively arranged along the tire circumference direction R, and a first top surface portion 17a and a first inclined surface portion 17b whose recess amount inward in a radial direction of the tire gradually increases in accordance with heading from the first top surface portion 17a toward the outer side in a width direction of the tire H are provided in a first land portion 17, and a second top surface portion 18a and a second inclined surface portion 18b whose recess amount inward in the radial direction of the tire gradually increases in accordance with heading from the second top surface portion 18a toward the inner side in the width direction of the tire H are provided in a second land portion 18, and by the first inclined surface portion 17b and the second inclined surface portion 18b mutually overlapping in the circumferential direction of the tire R, a V-shaped groove that has the first inclined surface portion 17b and the second inclined surface portion 18b as portions of side walls is formed. According to the present invention, it is possible to prevent a decline in steering stability and to improve drainage performance.

6 Claims, 2 Drawing Sheets

(56) References Cited

U.S. PATENT DOCUMENTS

| | | | |
|---|---|---|---|
| D559,168 S * | 1/2008 | Murata | D12/519 |
| D571,281 S * | 6/2008 | Murata et al. | D12/519 |
| D640,182 S * | 6/2011 | Kiwaki | D12/518 |
| 2001/0017177 A1 | 8/2001 | Himuro | |
| 2006/0108040 A1 | 5/2006 | Miyazaki | |
| 2010/0252157 A1* | 10/2010 | Ito | 152/209.8 |
| 2013/0048173 A1* | 2/2013 | Kiwaki | 152/209.18 |

FOREIGN PATENT DOCUMENTS

| | | |
|---|---|---|
| JP | 09-002024 A * | 1/1997 |
| JP | 2001-225610 A | 8/2001 |
| JP | 2003-170705 A | 6/2003 |
| JP | 2003-191715 A | 7/2003 |
| JP | 2003-326918 A | 11/2003 |
| JP | 2004-142698 A | 5/2004 |
| JP | 2007-055479 A | 3/2007 |

OTHER PUBLICATIONS

Machine translation for Europe 1,506,884 (no date).*
Machine translation for Japan 06-344726 (no date).*
Extended European Search Report dated Jan. 3, 2011, corresponding to Application No. PCT/JP2008054320.
International Search Report for PCT/JP2008/054320 dated Jun. 10, 2008.

* cited by examiner

PNEUMATIC TIRE WITH TREAD HAVING V-SHAPED GROOVE

TECHNICAL FIELD

The present invention relates to a pneumatic tire.

Priority is claimed on Japanese Patent Application No. 2007-064634, filed Mar. 14, 2007, the content of which is incorporated herein by reference.

BACKGROUND ART

As this type of pneumatic tire, a constitution such as shown for example in Patent Document 1 is conventionally known in which a plurality of circumferential direction main grooves that extend along a circumferential direction of the tire and a plurality of land portion sections that extend along the circumferential direction of the tire are formed on a tread surface portion.

By these circumferential direction main grooves, a pneumatic tire is made to easily discharge water between a wet road surface and a dry contact surface to the outside, that is, have good drainage performance.

[Patent Document 1] Japanese Unexamined Patent Application Publication No. 2003-170705

However, in the aforementioned conventional pneumatic tire, when a large compressive force acts on a ground contact area of the tire toward the inside in a radial direction of the tire while traveling on a dry road surface, the land portion that continues to the circumferential direction main groove is pushed in toward the inside in the radial direction of the tire, the belt layer that is inward of this portion locally buckles, and so the contact pressure that acts on this ground contact area of the tire becomes uneven, whereby the steering stability may be decreased.

The present invention has been achieved in view of the above circumstances, and has as its object to provide a pneumatic tire that is capable of preventing decrease of the steering stability and can improve drainage performance.

DISCLOSURE OF THE INVENTION

In order to solve the aforementioned issues and achieve such an object, the pneumatic tire of the present invention is a pneumatic tire in which a plurality of circumferential direction grooves that extend along the circumferential direction of the tire and a plurality of land portion sections that extend along the circumferential direction of the tire are formed in a tread surface portion, characterized by at least one of the land portion sections that are arranged at positions separated from an equatorial portion of the tire among the plurality of land portion sections being constituted by a first land portion and a second land portion that are alternately and consecutively arranged in the circumferential direction of the tire, and a first top surface portion that is positioned on the inner side of a width direction of the tire and a first inclined surface portion whose recess amount inward in the radial direction of the tire gradually increases in accordance with heading from the first top surface portion toward the outer side in the width direction of the tire being provided in the first land portion, a second top surface portion that is positioned on the outer side of the width direction of the tire and a second inclined surface portion whose recess amount inward in the radial direction of the tire gradually increases in accordance with heading from the second top surface portion toward the inner side in the width direction of the tire being provided in the second land portion, and by the first inclined surface portion and the second inclined surface portion mutually overlapping in the circumferential direction of the tire, one of the plurality of circumferential direction main grooves being formed in this land portion section as a V-shaped groove that has the first inclined surface portion and the second inclined surface portion as portions of side walls.

In this invention, since a V-shaped groove that has the first inclined surface portion and the second inclined surface portion as portions of side walls is formed in at least one of the land portion sections that are arranged at positions separated from the equatorial portion of the tire among the plurality of land portion sections that are formed in the tread surface portion, it becomes possible to absorb a compressive force heading inward in the radial direction of the tire that acts on the first top surface portion of the first land portion and the second top surface portion of the second land portion by the first and second inclined surface portions. Accordingly, during travel on a dry road surface, even if a large compressive force heading inward in the radial direction of the tire acts on the first top surface portion and the second top surface portion, it is possible to suppress the occurrence of buckling, and it is possible to prevent a decline in steering stability.

Also, since portions of the side walls that the V-shaped circumferential direction main groove 19 include the first and second inclined surface portions, by causing water between a wet road surface and the first and second top surface portions to pass over these first and second inclined surface portions, it is possible to make it smoothly flow into this V-shaped groove main groove without resistance, and it is possible to improve the drainage performance by preventing the water in the V-shaped groove from entering a turbulent state when flowing in.

Here, the V-shaped groove may be arranged in the tread surface portion at a position that is separated in the width direction of the tire from the equatorial portion of the tire by ½ of the distance in the width direction of the tire between the equatorial portion of the tire and the end portion in the width direction of the tire.

In this case, since the V-shaped groove is formed in the tread surface portion at a position that is separated in the width direction of the tire from the equatorial portion of the tire by ½ of the distance in the width direction of the tire between the equatorial portion of the tire and the end portion in the width direction of the tire where buckling most easily occurs, it is possible to reliably suppress the occurrence of this buckling.

Also, the depths at the respective inward ends in the radial direction of the tire of the first inclined surface portion and the second inclined surface portion may be mutually equivalent, and the first inclined surface portion and the second inclined surface portion may mutually overlap in the circumferential direction of the tire at a depth position of between 30% and 80% of the depth at their respective inward ends in the radial direction of the tire.

In this case, the aforementioned operation effect comes to be reliably exhibited.

That is, when the first inclined surface portion and the second inclined surface portion mutually overlap in the circumferential direction of the tire at a depth position that is less than 30% of the depth at their respective inward ends in the radial direction of the tire, the internal volume of this V-shaped groove is insufficient, leading to the drainage performance being insufficient, also, when the first inclined surface portion and the second inclined surface portion mutually overlap in the circumferential direction of the tire at a depth position that is greater than 80% of the depth at their respective inward ends in the radial direction of the tire, there is a risk of preventing the occurrence of buckling becoming difficult.

Moreover, the size of the first land portion in the circumferential direction of the tire may gradually become smaller in accordance with heading toward the outer side in the width direction of the tire, and the size of the second land portion in the circumferential direction of the tire may gradually become smaller in accordance with heading toward the inner side in the width direction of the tire.

In this case, since the size of the first land portion in the circumferential direction of the tire gradually becomes smaller in accordance with heading toward the outer side in the width direction of the tire, and the size of the second land portion in the circumferential direction of the tire gradually becomes smaller in accordance with heading toward the inner side in the width direction of the tire, it becomes possible to additionally facilitate flowing of water between the wet road surface and the first and second top surface portions into the V-shaped groove, and in addition to being able to reliably increase the drainage performance, it becomes possible to prevent the rigidity of the first top surface portion and the second top surface portion from decreasing by forming the V-shaped groove, and it is possible to prevent a reduction in steering stability and quietness when traveling over a dry road surface.

Effect of the Invention

According to this invention, along with being able to prevent a reduction in steering stability, it is possible to improve the drainage performance.

Figure 1:
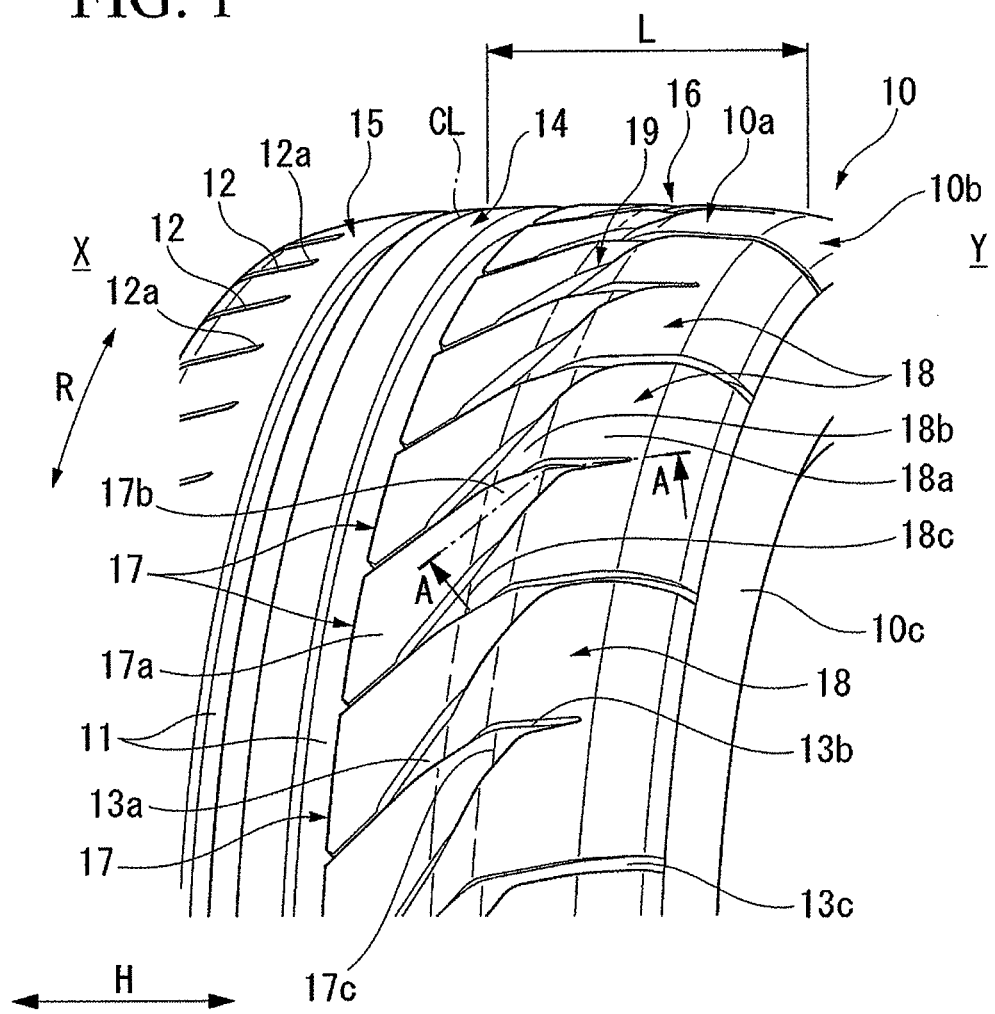
FIG. 1 A perspective view that shows a portion of the pneumatic tire in the embodiment in accordance with the present invention.

DESCRIPTION OF REFERENCE NUMERALS 10 pneumatic tire; 10a tread surface portion; 11, 19 circumferential direction main groove; 14 center land portion section (land portion section); 15 inner side shoulder land portion section (land portion section); 16 outer side shoulder land portion section (land portion section); 17 first land portion; 17a first top surface portion; 17b first inclined surface portion; 17c inward end in the radial direction of the tire of the first inclined surface portion; 18 second land portion; 18a second top surface portion; 18b second inclined surface portion; 18c inward end in the radial direction of the tire of the second inclined surface portion; 19 V-shaped circumferential direction main groove (V-shaped groove); CL equatorial portion of the tire; H width direction of the tire; L distance; R circumferential direction of the tire

BEST MODE FOR CARRYING OUT THE INVENTION

Figure 2:
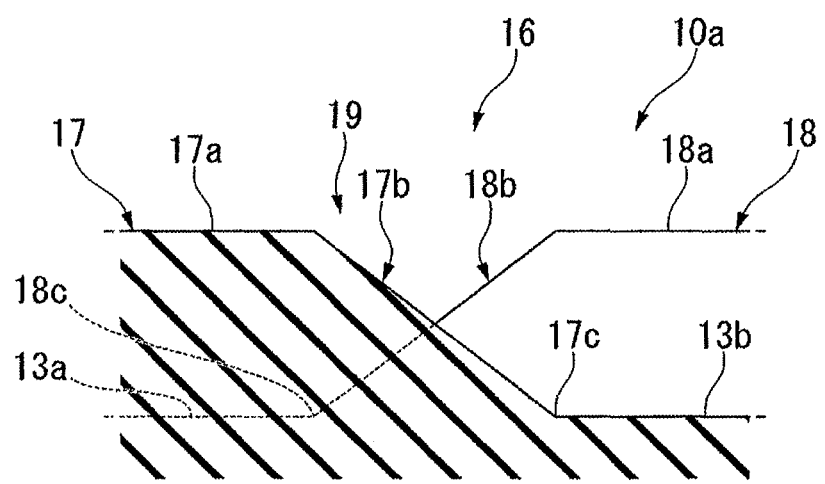
FIG. 2 A cross-sectional view along line A-A of the pneumatic tire shown in FIG. 1.

Hereinbelow, one embodiment of the pneumatic tire in accordance with the present invention shall be described with reference to FIG. 1 and FIG. 2. In a tread surface portion 10a of this pneumatic tire 10 are formed a plurality of circumferential direction main grooves 11 and 19 that extend along a circumferential direction of the tire R and a plurality of land portion sections 14, 15, and 16 that extend along a circumferential direction of the tire R. Note that the plurality of circumferential direction main grooves 11 and 19 are formed apart in the tread surface portion 10a with a mutual interval in a width direction of the tire H.

Also, this pneumatic tire 10 is provided with a left-right pair of bead portions, a tread portion 10b that is disposed to the outside in a radial direction of the tire of the bead portions and has a tread surface portion 10a, a left-right pair of sidewall portions 10c that couple both end portions of this tread portion 10b in the width direction of the tire and the outer ends of the bead portions in the radial direction of the tire. A carcass layer is provided that continuously extends across each of the inner portions of the bead portions, the sidewall portions 10c and the tread portion 10c. Also, an indicator not illustrated is provided on the pneumatic tire 10 to show the direction of mounting on a vehicle.

Here, in the illustrated embodiment, three of the circumferential direction main grooves 11 and 19 are formed on the tread surface portion 10a, and two of these are respectively formed at mutually opposite positions sandwiching an equatorial portion of the tire CL in the width direction of the tire H, in the central portion of the tread surface portion 10a in the width direction H. By these two circumferential direction main grooves 11, the tread surface portion 10a is partitioned into a center land portion section 14 that is positioned on the equatorial portion of the tire CL, an inner side shoulder land portion section 15 that is positioned to an inner side of the vehicle X of the equatorial portion of the tire CL, and an outer side shoulder land portion section 16 that is positioned to an outer side of the vehicle Y of the equatorial portion of the tire CL.

In the inner side shoulder land portion section 15, a plurality of inner side lateral grooves 12 that extend in the width direction of the tire H are formed with a mutual interval in the tire circumference direction R.

Each inner side lateral groove 12 extends along the width direction of the tire H, straddling the end portion in the width direction of the tire H at the inner side of the vehicle X of the tread surface portion 10a so that an inward end 12a in the width direction of the tire H is positioned further to the inner side of the vehicle X than the circumferential direction main groove 11 that is positioned on the inner side of the vehicle X among the two circumferential direction main grooves 11, and an outward end in the width direction of the tire H is positioned on the side portion of the inner side of the vehicle X among both side portions of the tread portion 10b.

Also, on the outer side shoulder land portion section 16 are formed a plurality of first outer side lateral grooves 13a, second outer side lateral grooves 13b, and third outer side lateral grooves 13c.

A plurality of the first outer side lateral grooves 13a are formed with a mutual interval in the tire circumference direction R on the inner side of the vehicle X end portion of the outer side shoulder land portion section 16, and are in communication with the circumferential direction main groove 11 that is positioned on the outer side of the vehicle Y among the two circumferential direction main grooves 11. Also, the second outer side lateral grooves 13b and the third outer side lateral grooves 13c are formed with a mutual interval in the tire circumference direction R on the end portion of the outer side shoulder land portion section 16 on the outer side of the vehicle Y. Among these, the second outer side lateral grooves 13b are disposed further to the inner side of the vehicle X in the tread surface portion 10a than the end portion on the outer side of the vehicle Y. Also, the third outer side lateral grooves 13c straddle the end portion on the outer side of the vehicle Y in the tread surface portion 10a and reach until the side portion on the outer side of the vehicle Y among both side portions of the tread portion 10b.

In the present embodiment, the outer side shoulder land portion section 16 is constituted by a first land portion 17 and a second land portion 18 being alternately and consecutively arranged along the tire circumference direction R.

The first land portion 17 is provided with a first top surface portion 17a that is positioned on the inner side of the width direction of the tire H and a first inclined surface portion 17b whose recess amount inward in the radial direction of the tire gradually increases heading from the first top surface portion 17a toward the outer side in the width direction of the tire H. Note that the first top surface portion 17a constitutes a portion of a ground contact area of the tire that makes ground contact when this pneumatic tire 10 is in a state of rest on a flat road surface under regular conditions. Also, the first top surface portion 17a is arranged between the first outer side lateral grooves 13a that are adjacent in the tire circumference direction R.

The second land portion 18 is provided with a second top surface portion 18a that is positioned on the outer side of the width direction of the tire H and a second inclined surface portion 18b whose recess amount inward in the radial direction of the tire gradually increases heading from the second top surface portion 18a toward the inner side in the width direction of the tire H. Note that the second top surface portion 18a constitutes a portion of the ground contact area of the tire. Also, the second top surface portion 18a is arranged between the second outer side lateral groove 13b and the third outer side lateral groove 13c that are adjacent in the tire circumference direction R.

As a result of the first inclined surface portion 17b and the second inclined surface portion 18b mutually overlapping in the tire circumference direction R, the V-shaped circumferential direction main groove 19 is formed that has the first inclined surface portion 17b and the second inclined surface portion 18b as portions of side walls.

Here, regular conditions means that the load and the internal pressure are respectively the maximum load (maximum load capacity) of a single wheel of a suitable size indicated in the following specification and the air pressure that corresponds thereto, and that the rim is a standard rim of a suitable size that is indicated in the following specification (or an "Approved Rim," "Recommended Rim").

Note that the flat road surface means an ideal smooth road surface.

The specification is determined by the valid industry specification in the region where the tire is manufactured or used. For example, "Year book" of "The Tire and Rim Association Inc." in the United States, the "Standards Manual" of "The European Tire and Rim Technical Organization" in Europe, and as specified by the "JATMA Year Book" of the "Japan Automobile Tire Manufacturers Association".

Also, in the present embodiment, the V-shape circumferential direction groove 19 is arranged in the tread surface portion 10a at a position that is separated in the width direction of the tire H from the equatorial portion of the tire CL by ½ of the distance L in the width direction of the tire H between the equatorial portion of the tire CL and the end portion in the width direction of the tire H. In the illustrated embodiment, the first inclined surface portion 17b and the second inclined surface portion 18b mutually overlap in the tire circumference direction R at a position separated in the width direction of the tire H from the equatorial portion of the tire CL by ½ of the distance L.

Here, the depths of the respective inward ends 17c and 18c in the radial direction of the tire of the first inclined surface portion 17b and the second inclined surface portion 18b are mutually equivalent. The first inclined surface portion 17b and the second inclined surface portion 18b mutually overlap in the circumferential direction of the tire R at a depth position of between 30% and 80% of the depth at the respective inward ends 17c and 18c in the radial direction of the tire. Note that in the illustrated embodiment, the depth of each of the first inclined surface portion 17b and the second inclined surface portion 18b at the respective inward ends 17c and 18c in the radial direction of the tire is the same as the depth of the circumferential direction main groove 11 that is formed in the central portion of the tread surface portion 10a in the width direction of the tire H.

Moreover, in the present embodiment, the size of the first land portion 17 in the circumferential direction of the tire R gradually becomes smaller in accordance with heading toward the outer side in the width direction of the tire H, and the size of the second land portion 18 in the circumferential direction of the tire R gradually becomes smaller in accordance with heading toward the inner side in the width direction of the tire H. Also, the inward end 17c in the circumferential direction of the tire R of the first land portion 17 overlaps with the second top surface portion 18a of the second land portion 18. Moreover, the inward end 18c in the circumferential direction of the tire R of the second land portion 18 overlaps with the first top surface portion 17a of the first land portion 17.

Note that in the illustrated embodiment, the first land portion 17 inclines toward one direction (upward on the sheet) in the circumferential direction of the tire R in accordance with heading toward the outer side in the width direction of the tire H, and the second land portion 18 inclines toward the opposite direction (downward on the sheet) of the one direction in the circumferential direction of the tire R in accordance with heading toward the inner side in the width direction of the tire H.

Also, in the illustrated embodiment, the inward end 18c in the radial direction of the tire of the second land portion 18 continues into the bottom of the circumferential direction main groove 11 that is positioned on the outer side of the vehicle Y among the two circumferential direction main grooves 11 via the bottom of the first outer side lateral groove 13a.

Moreover, the inward end 17c in the radial direction of the tire of the first land portion 17 continues into the bottom of the second outer side lateral groove 13b or the bottom of the third outer side lateral groove 13c.

As described above, according to the pneumatic tire 10 of the present embodiment, since the V-shaped circumferential direction main groove 19 in which the first inclined surface portion 17b and the second inclined surface portion 18b serve as portions of side walls is formed in the outer side shoulder land portion section 16, it becomes possible to absorb a compressive force heading inward in the radial direction of the tire that acts on the first top surface portion 17a and the second top surface portion 18a by the first and second inclined surface portions 17b and 18b.

Accordingly, during travel on a dry road surface, even if a large compressive force heading inward in the radial direction of the tire acts on the first top surface portion 17a and the second top surface portion 18a, it is possible to suppress the occurrence of buckling, and it is possible to prevent a decline in steering stability.

Also, since portions of the side walls that the V-shaped circumferential direction main groove 19 include the first and second inclined surface portions 17b and 18b, by causing water between the wet road surface and the first and second top surface portions 17a and 18a to pass over these first and second inclined surface portions 17b and 18b, it is possible to make it smoothly flow into this circumferential direction main groove 19 without resistance, and it is possible to improve the drainage performance by preventing the water in the V-shaped circumferential direction main groove 19 from entering a turbulent state when flowing in.

Furthermore, in the present embodiment, since the V-shaped circumferential direction main groove 19 is formed in the tread surface portion 10a at a position that is separated in the width direction of the tire H from the equatorial portion of the tire CL by ½ of the distance L where buckling most easily occurs, it is possible to reliably suppress the occurrence of this buckling.

Also, in the present embodiment, since the first inclined surface portion 17b and the second inclined surface portion 18b mutually overlap in the circumferential direction of the tire R at the depth position of between 30% and 80% of the depth at the respective inward ends 17c and 18c in the radial direction of the tire, the aforementioned operation effect comes to be reliably exhibited.

Furthermore, in the present embodiment, the size of the first land portion 17 in the circumferential direction of the tire R gradually becomes smaller in accordance with heading toward the outer side in the width direction of the tire H, and the size of the second land portion 18 in the circumferential direction of the tire R gradually becomes smaller in accordance with heading toward the inner side in the width direction of the tire H. Therefore, it becomes possible to additionally facilitate flowing of water between the wet road surface and the first and second top surface portions 17a and 18a into the V-shaped circumferential direction main groove 19, and in addition to being able to reliably improve drainage performance, it becomes possible to prevent the rigidity of the first top surface portion 17a and the second top surface portion 18a that constitute a portion of the ground contact area of the tire from decreasing by forming the V-shaped circumferential direction main groove 19, and it is possible to prevent a reduction in steering stability and quietness when traveling over a dry road surface.

Also, in the present embodiment, since the inward end 17c in the radial direction of the tire of the first inclined surface portion 17b overlaps in the circumferential direction of the tire R with the second top surface portion 18a of the second land portion 18, and the inward end 18c in the radial direction of the tire of the second inclined surface portion 18b overlaps in the circumferential direction of the tire R with the first top surface portion 17a of the first land portion 17, the side walls of the V-shaped circumferential direction main groove 19 have not only the first inclined surface portion 17b and the second inclined surface portion 18b but also the respective sides of the first top surface portion 17a of the first land portion 17 and the second top surface portion 18a of the second land portion 18, so it becomes possible to facilitate ensuring sufficient internal volume of this circumferential direction main groove 19, and it is possible to reliably increase the drainage performance.

Note that the technical scope of the present invention is not limited to the aforementioned embodiment, and it is possible to make various modifications within a scope that does not depart from the spirit of the present invention.

For example, the aforementioned embodiment shows a constitution of the V-shaped circumferential direction main groove 19 consisting of the first inclined surface portion 17b and the second inclined surface portion 18b mutually overlapping in the tire circumference direction R at a position separated in the width direction of the tire H from the equatorial portion of the tire CL by ½ of the distance L in the width direction of the tire H between the equatorial portion of the tire CL and the end portion in the width direction of the tire H. However, the position in the width direction of the tire H of overlapping in this way is not limited to this embodiment.

Also, the position in the width direction of the tire H of forming the V-shaped circumferential direction main groove 19 in the tread surface portion 10a is not limited to this embodiment and may be formed at any position provided it is separated from the equatorial portion of the tire CL in the tread surface portion 10a.

Moreover, in this embodiment, this circumferential direction main groove 19 was formed only in the outer side shoulder land portion section 16, but it may also be formed in the inner side shoulder land portion section 15, and may also be formed only in the inner side shoulder land portion section 15 without being formed in the outer side shoulder land portion section 16.

Also, the depth position at which the first inclined surface portion 17b and the second inclined surface portion 18b mutually overlap in the tire circumference direction R is not limited to the present embodiment.

Furthermore, in the present embodiment, the depths at the respective inward ends 17c and 18c in the radial direction of the tire of the first inclined surface portion 17b and the second inclined surface portion 18b were made mutually equivalent, but may be made to differ.

Also, in the present embodiment, the size of the first land portion 17 in the circumferential direction of the tire R gradually becomes smaller in accordance with heading toward the outer side in the width direction of the tire H, and the size of the second land portion 18 in the circumferential direction of the tire R gradually becomes smaller in accordance with heading toward the inner side in the width direction of the tire H, but instead of this, for example, each size of the first land portion 17 and the second land portion 18 in the circumferential direction of the tire R may be made equal throughout the width direction of the tire H.

Furthermore, the first inclined surface portion 17b and the second inclined surface portion 18b are made to incline in a linear shape heading inward in the radial direction of the tire, but may also be made to incline in a curved shape.

Still further, instead of the aforementioned embodiment, the first land portion 17 and the second land portion 18 may be extended parallel with the width direction of the tire H without sloping in the circumferential direction of the tire R.

Next, verification testing of the operational effects described above was carried out.

First, the pneumatic tires supplied to this test shall be described. As the pneumatic tire 10 of an example of the present invention, the pneumatic tire shown in FIG. 1 and FIG. 2 was used, and as the pneumatic tire of the conventional example, a pneumatic tire in which a circumferential direction groove 11 of the same shape and same size as the circumferential direction main groove 11 that is formed in the central portion of the tread surface portion 10a in the width direction of the tire H is formed instead of the V-shaped circumferential direction main groove 19 in the pneumatic tire 10 shown in FIG. 1 and FIG. 2 was used.

Also, the size of each pneumatic tire was 225/45R17, and each pneumatic tire was attached to a rim of size 7J-17, inflated to the vehicle specified pressure, and mounted on a vehicle.

Then, the steering stability was evaluated when driving on a dry road surface of an ordinary road and a circuit with the driver's weight and a 600 N vertical load mounted on this vehicle. This evaluation was carried out based on the feeling of the driver, and the evaluation was made with an index having the conventional pneumatic tire set to 100.

Moreover, this vehicle was driven on a set road surface having a water depth of 10 mm, and the drainage performance was evaluated based on the speed at which the hydroplaning phenomenon occurred. This evaluation was made with an index having the conventional pneumatic tire set to 100.

The results are shown in Table 1. Note that in this table, the higher the number in each evaluation item, the better the performance.

TABLE 1

|  |  | Example | Conventional Example |
|---|---|---|---|
| Steering Stability | Ordinary Road | 102 | 100 |
|  | Circuit | 108 | 100 |
| Drainage Performance |  | 103 | 100 |

According to this result, it was confirmed that with the pneumatic tire of the example, it becomes possible to prevent a decline in steering stability and it is possible to improve the drainage performance. In particular, with the pneumatic tire of the example, compared to the pneumatic tire of the conventional example, it was confirmed that it is possible to greatly improve the steering stability on a dry road surface of a circuit where a high load acts on the pneumatic tire during vehicle running.

INDUSTRIAL APPLICABILITY

According to the present invention, it is possible to provide a pneumatic tire in which it becomes possible to prevent a decline in steering stability and which is capable of improving drainage performance.

The invention claimed is:

1. A pneumatic tire comprising:
a plurality of circumferential direction main grooves extending in a circumferential direction of the tire and formed in a tread surface portion of the tire; and
a plurality of land portion sections extending in the circumferential direction of the tire and formed in the tread surface portion,
wherein at least one of the land portion sections that are arranged at positions that are separated from an equatorial portion of the tire among the plurality of land portion sections is constituted of a first land portion and a second land portion that are alternately and consecutively arranged in the circumferential direction of the tire,
a first top surface portion that is positioned on the inner side of a width direction of the tire and a first inclined surface portion whose recess amount inward in the radial direction of the tire gradually increases in accordance with heading from the first top surface portion toward the outer side in the width direction of the tire are provided in the first land portion, a second top surface portion that is positioned on the outer side of the width direction of the tire and a second inclined surface portion whose recess amount inward in the radial direction of the tire gradually increases in accordance with heading from the second top surface portion toward the inner side in the width direction of the tire are provided in the second land portion, and by the first inclined surface portion and the second inclined surface portion mutually overlapping in the circumferential direction of the tire, one of the plurality of circumferential direction main grooves is formed in this land portion section as a V-shaped groove that has the first inclined surface portion and the second inclined surface portion as portions of side walls,
the V-shaped groove is disposed only further to an outer side of a vehicle on which the tire is mounted, than the equatorial portion,
a second one of the plurality of circumferential direction main grooves includes a bottom surface continuously extending in the circumferential direction of the tire,
the second one of the plurality of circumferential direction main grooves is entirely disposed further to an inner side of the vehicle than the first land portion, and
wherein the second one of the plurality of circumferential direction main grooves is disposed to be adjacent to the first land portion, and has a constant depth on the entire circumference of the tire,
a first groove is formed between two first land portions adjacent to each other in the circumferential direction, and
an inward end of the second inclined surface portion on the inner side in the width direction of the tire connects to a bottom of the second one of the plurality of circumferential direction main grooves via a bottom of the first groove
no circumferential direction main groove formed by overlapping land portions in the circumferential direction is disposed at the equatorial portion and further to the inner side of the vehicle, than the equatorial portion.

2. The pneumatic tire according to claim 1, wherein the V-shaped groove is arranged in the tread surface portion at a position that is separated in the width direction of the tire from the equatorial portion of the tire by ½ of the distance in the width direction of the tire between the equatorial portion of the tire and the end portion in the width direction of the tire.

3. The pneumatic tire according to claim 1, wherein the depths at the respective inward ends in the radial direction of the tire of the first inclined surface portion and of the second inclined surface portion are mutually equivalent, and
the first inclined surface portion and the second inclined surface portion mutually overlap in the circumferential direction of the tire at a depth position of a percentage between 30% and 80% of the depth at their respective inward ends in the radial direction of the tire.

4. The pneumatic tire according to claim 1, wherein the size of the first land portion in the circumferential direction of the tire gradually decreases in accordance with heading toward the outer side in the width direction of the tire; and
the size of the second land portion in the circumferential direction of the tire gradually decreases in accordance with heading toward the inner side in the width direction of the tire.

5. The pneumatic tire according to claim 1, wherein an inner side shoulder land portion section among the plurality of land portion sections is composed of a third land portion continuously extending in the circumferential direction, the third land portion reaching an edge of the tread surface portion on an inner side of the vehicle,
the third land portion is provided with lateral grooves extending in a direction crossing to the circumferential direction, and ends of the lateral grooves on an outer side of the vehicle are positioned further to an inner side of the vehicle, than an edge of the third land portion on an outer side of the vehicle.

6. The pneumatic tire according to claim 5,
wherein second inclined surface portions whose recess amount inward in the radial direction of the tire gradually increases in accordance with heading from the second top surface portion toward the inner side in the width direction of the tire are provided in the second land portion, and by the first inclined surface portion and each second inclined surface portion mutually overlapping in the circumferential direction of the tire, the V-shaped groove is formed, the second land portion is provided with a second groove extending in a direction crossing to the circumferential direction, and an end of the second groove on an outer side of the vehicle is positioned further to an inner side of the vehicle, than an edge of the second top surface portion on an outer side of the vehicle, a third groove is formed between two second land portions adjacent to each other in the circumferential direction, and the third groove reaches an edge of the tread surface portion on an outer side of the vehicle, the second groove is disposed between the second inclined surface portions adjacent to each other in the circumferential direction, and the first inclined surface portion is disposed between, in the circumferential direction, the second inclined surface portions between which the second groove is disposed.

* * * * *